United States Patent
Mache

(10) Patent No.: US 7,209,956 B2
(45) Date of Patent: Apr. 24, 2007

(54) PROTOCOL FOR INSTANT MESSAGING

(75) Inventor: Niels Mache, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 773 days.

(21) Appl. No.: 09/727,257

(22) Filed: Nov. 30, 2000

(65) Prior Publication Data

US 2001/0003203 A1    Jun. 7, 2001

(30) Foreign Application Priority Data

Dec. 2, 1999    (EP)    ............................ 99124151

(51) Int. Cl.
*G06F 15/16* (2006.01)
*G06F 7/04* (2006.01)

(52) U.S. Cl. .......................... 709/207; 726/2

(58) Field of Classification Search ................ 709/223, 709/201, 220, 238, 245, 249, 206–207; 726/2
See application file for complete search history.

(56) References Cited

U.S. PATENT DOCUMENTS

| 5,608,786 | A | | 3/1997 | Gordon |
| 5,740,230 | A | * | 4/1998 | Vaudreuil ................. 379/88.22 |
| 5,742,905 | A | | 4/1998 | Pepe et al. |
| 5,974,447 | A | * | 10/1999 | Cannon et al. ............. 709/206 |
| 6,374,295 | B2 | * | 4/2002 | Farrow et al. ............. 709/223 |
| 6,636,587 | B1 | * | 10/2003 | Nagai et al. ............. 379/88.14 |
| 2002/0016824 | A1 | * | 2/2002 | Leeds ........................ 709/207 |

FOREIGN PATENT DOCUMENTS

WO    WO 98 58491    12/1998

OTHER PUBLICATIONS

Robichaux (Paul Robichaux, Managing Microsoft Exchange Server, ISBN: 1565925459, Jul. 1999).*
Sakellariadis (Spyros Sakellariadis, "Using Exchange Server with SMTP and POP3", Jun. 1998, http://www.windowsitpro.com/Windows/Article/ArticleID/3475/3475.html).*
Hunt (Craig Hunt, "TCP/IP Network Administration", O'Reilly and Associates, 1998, ISBN: 1565923227) p. 212-225.*

* cited by examiner

*Primary Examiner*—Gilberto Barrón, Jr.
*Assistant Examiner*—Peter Poltorak
(74) *Attorney, Agent, or Firm*—Oblon, Spivak, McClelland, Maier & Neustadt, P.C.

(57) ABSTRACT

Messages are transmitted in nearly real-time in a distributed system. The message transmission system comprises a first message gateway (4) receiving a message from a sending client (9). Meta information is extracted by the first message gateway (4) from the received message and the meta information (MI) is transmitted from the first message gateway (4) to a message broker (2) connected to a client profile database (3). The message broker (2) selects a second message gateway (5) on the basis of the meta information and the client profile data of the client profile database (3). Than a message from the first message gateway (4) is transmitted to the selected second message gateway (5) which transfers the message to a target client (8).

9 Claims, 8 Drawing Sheets

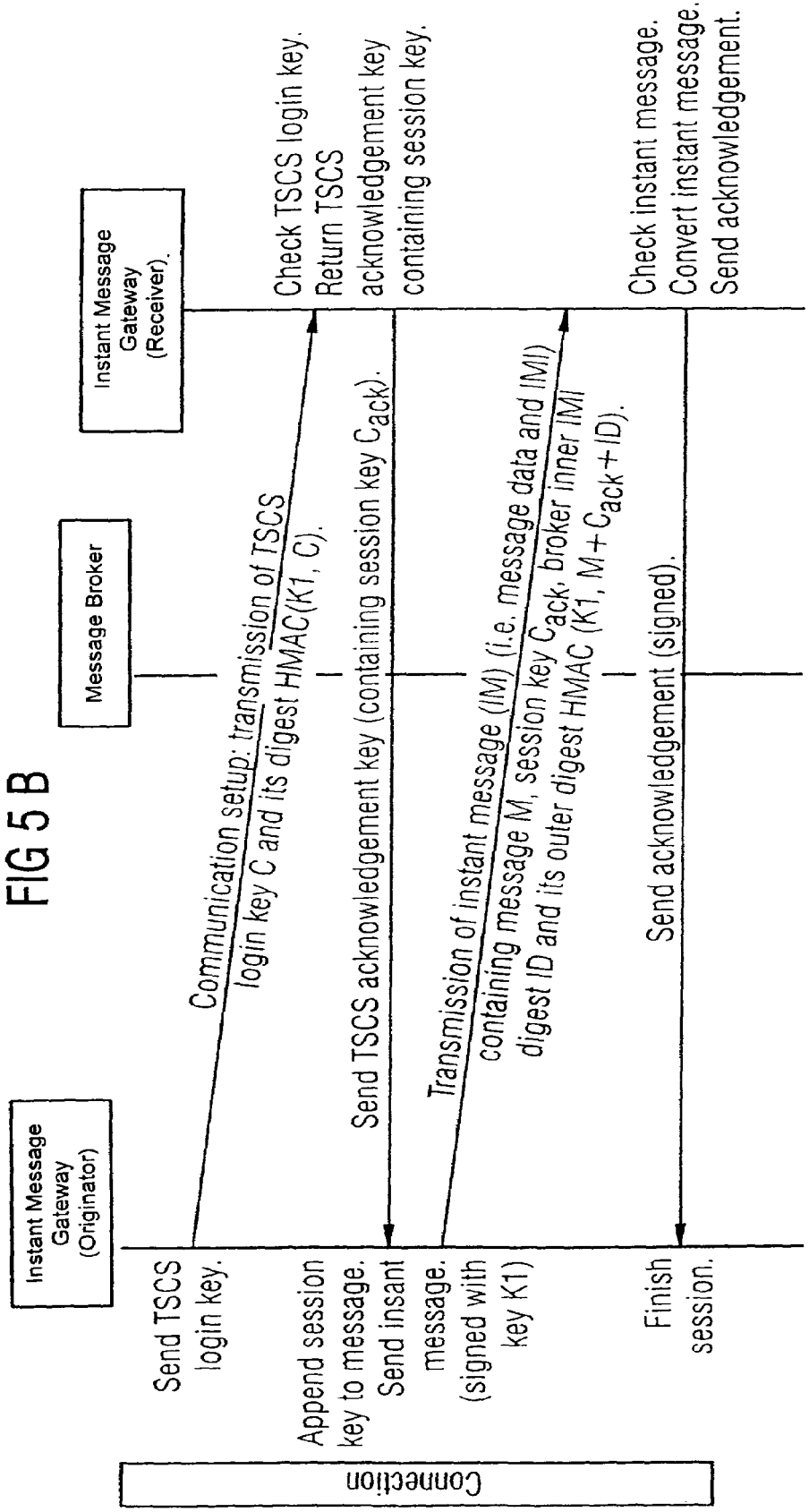

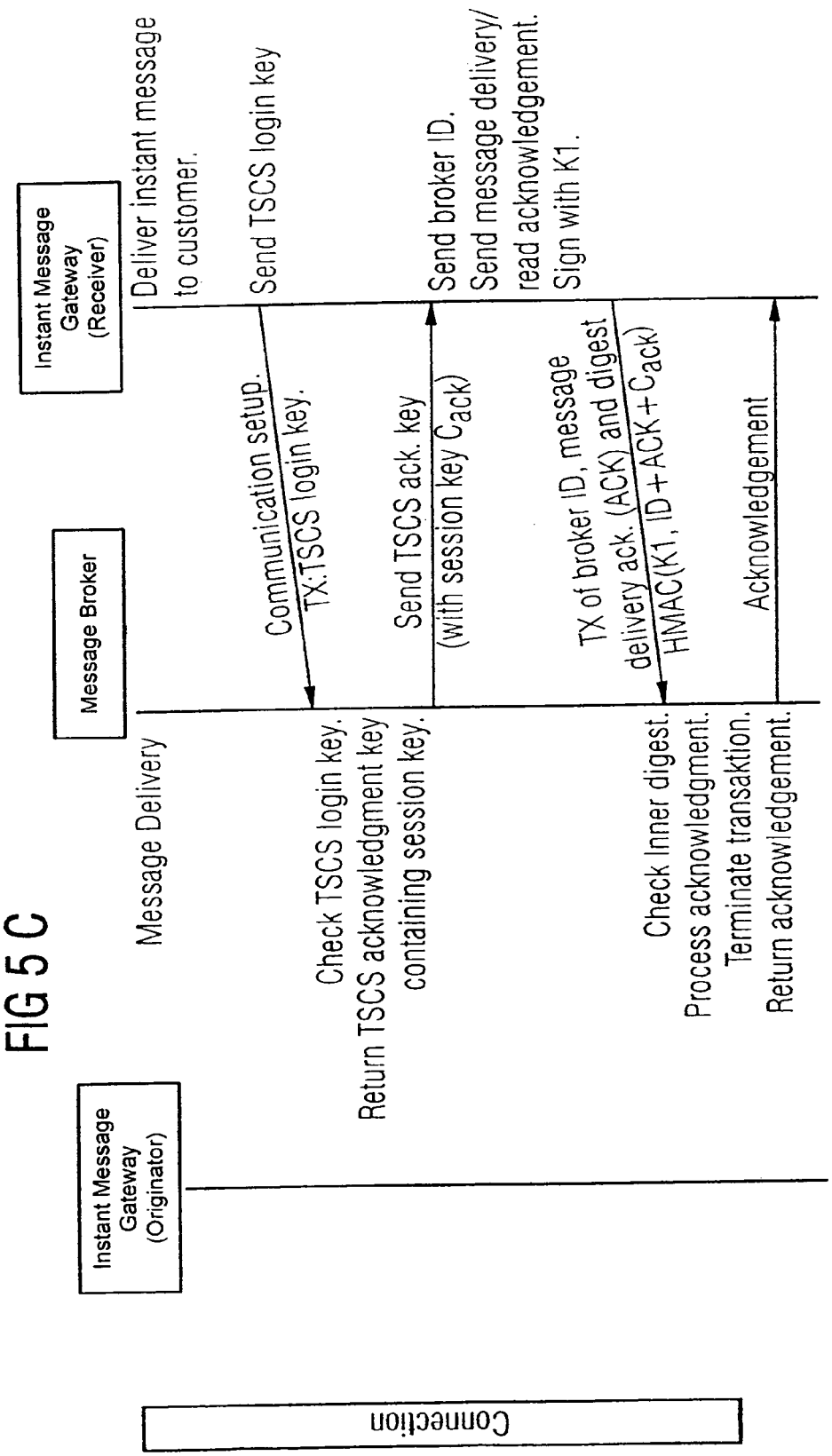

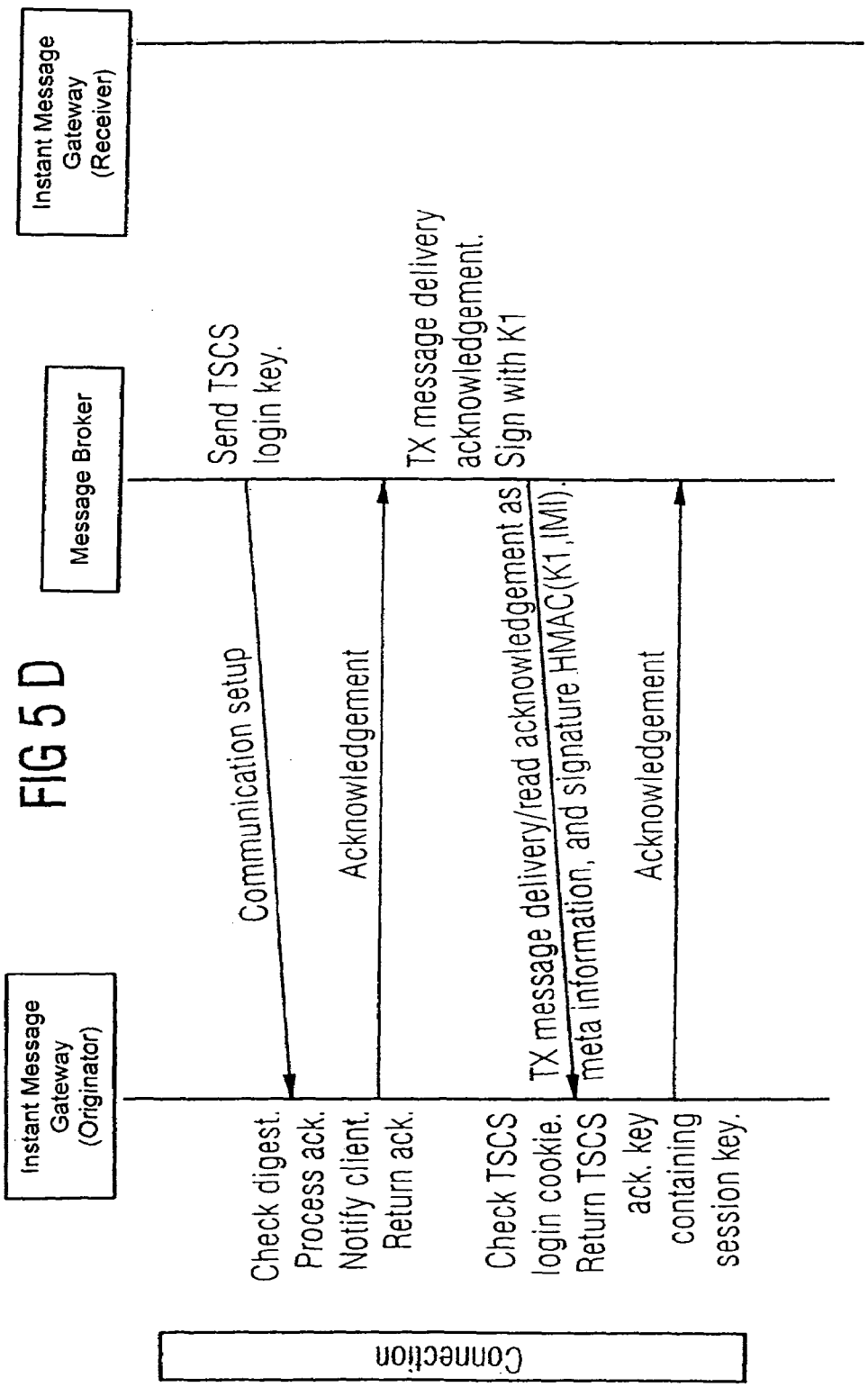

PROTOCOL FOR INSTANT MESSAGING

The present invention relates to a method for the transmission of messages in a distributed system, to a computer program product for implementing such a method in a network environment as well as to a distributed system for the transmission of messages.

The present invention generally relates to the field of electronic messaging. Electronic messages in the form of e-mails or GSM short message texts are known. They rely on a store-and-forward technique where the originator of the message sends the message to a computer node. In the node the message is stored and then forwarded to other nodes until it reaches a mailbox belonging to the intended user.

Also known from prior art are dedicated gateways for transferring a message from one transfer medium (e.g. SMS) to another transfer medium (e.g. fax). Several GSM network operators and independent service providers offer functionality like this. The major disadvantage of such systems is that there are targeted at a fixed transfer task, so is from one well-defined medium into another.

Another means known from prior art is the use of inexpensive intermediate networks for transmitting messages between different locations. For example, one could send a document as an attachment of a e-mail. This combined message is sent to dedicated gateway where it is converted to fax and transmitted to the intended recipient.

From U.S. Pat. No. 5,608,786 an unified messaging system is known. This known technique makes use of existing communication channels or networks. Part of the system relies on a data communication network forming an intermediate leg of the distribution network. Telephone communication is typically used for initial or final legs. Voice mail, E-mail, facsimiles and other message types can be received by the system for retrieval by the subscriber. Communications may be centralised and retrieval of messages can be accomplished using one of a number of separate and distinct approaches. Thus, data communication networks such as the internet can become global voice mail and facsimile mail systems.

As state of the art messaging systems like e-mail have a store-and-forward-communication structure, they have inherently problems with instant (i.e. nearly real-time) message delivery.

Furthermore nearly real-time transmission of messages implies a big number of processing systems for high message throughput.

Therefore it is the object of the present invention to provide for a technique for the transmission of messages in a distributed system enabling for a high message throughput and a decreased load on the processing units of the distributed system.

Said object is achieved by means of the features of the independent claims. The dependent claims develop further the central idea of the present invention.

According to a first aspect of the present invention a method for the transmission of messages in a distributed system is provided. A message is received from a sending client by means of a first message gateway. Meta information extracted from the received message is transmitted from the first message gateway to a message broker. A second message gateway is selected on the basis of the meta information and client profile data. The message is sent from the first message gateway to the selected second message gateway to transfer it to a target client.

The message broker can process the meta information to provide for security and authentication and returns it to the first message gateway.

The message broker can process the meta information and return it to the first message gateway such that controlled by the processed meta information the message can be sent to the selected second gateway together with the meta information.

The message itself can be converted by a message processor before it is sent to the selected second message gateway.

According to another aspect the computer program product for implementing such a method in a network environment is provided.

According to still another aspect to the present invention a distributed system for the transmission of messages is provided. The system comprises a first message gateway for the reception of messages from sending clients and for the extraction of meta information from the received messages. A message broker receives the meta information from the first message gateway, processes the meta information and returns it to the first message gateway. The system furthermore comprises a second message gateway (which can be identical to the first message gateway) for receiving the message from the first message gateway controlled by the processed meta information and for sending the message to a target client.

A client profile database can be connected to the message broker. The message broker processes the meta information on the basis of the data of the client profile database.

The message broker can furthermore provide for a security and/or authentication functionality.

A message processor can be interconnected between the first and second message gateway for processing the content (and not the meta information) of a message.

Further features, advantages or objects of the present invention will be evident for the man skilled in the art when reading the following detailed description of embodiment of the present invention taken in conjunction with the figures of the enclosed drawings.

Figure 1:
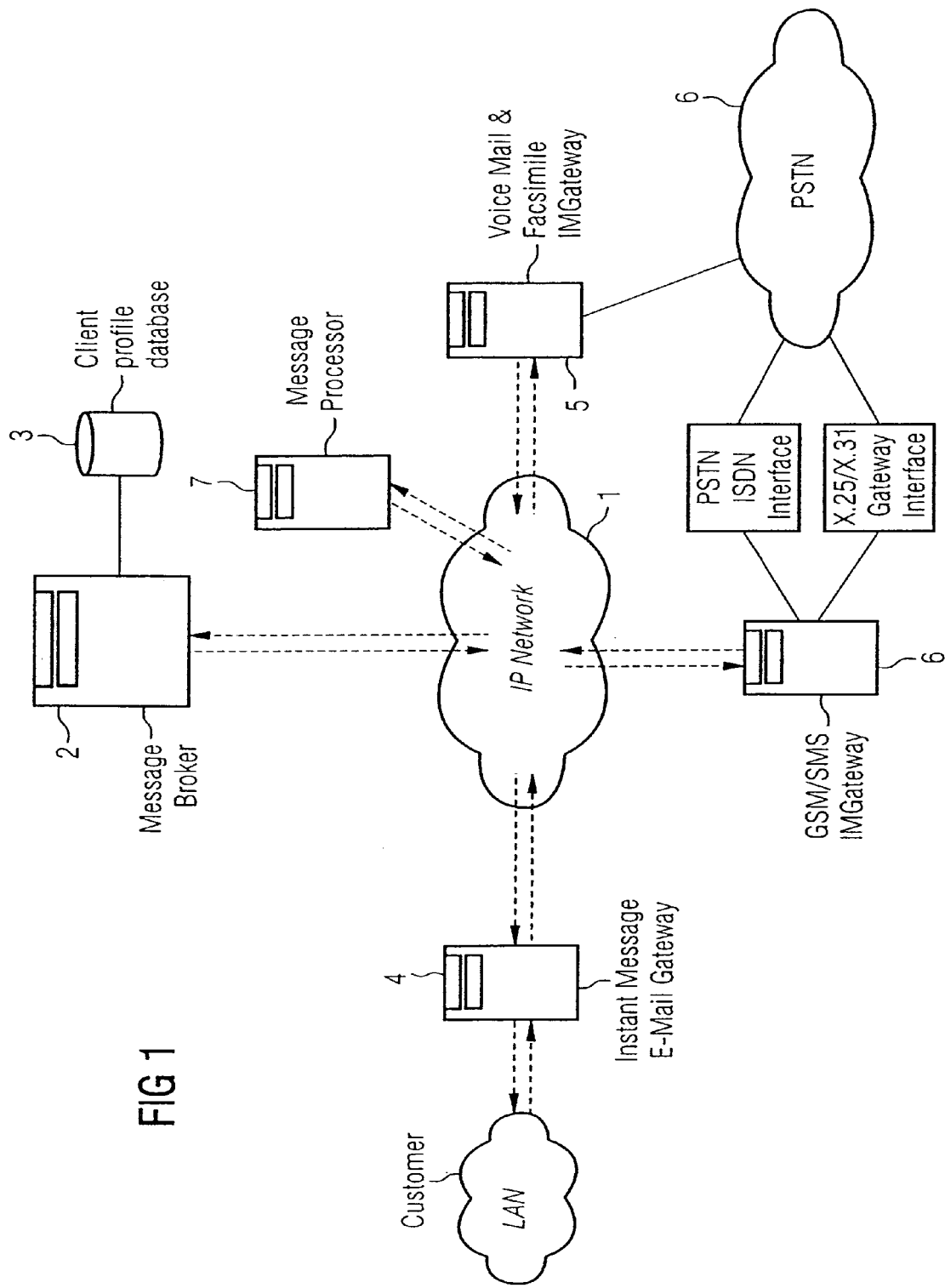
FIG. 1 shows an example of a instant messaging system.

FIG. 1 shows an example of a instant messaging system. The system essentially consists of message brokers 2 connected to client profile databases 3, gateways for e-mail 4, gateways for GSM/SMS 6, gateways for voice mail and facsimile 5 which can communicate with each other by means of a network 1. At least one message processor 7 can process particularly the content of transmitted messages. The message broker 2 manages the system configuration and state, user profiles of the client profile database 3, message routing and services, accounting and security.

Figure 2:
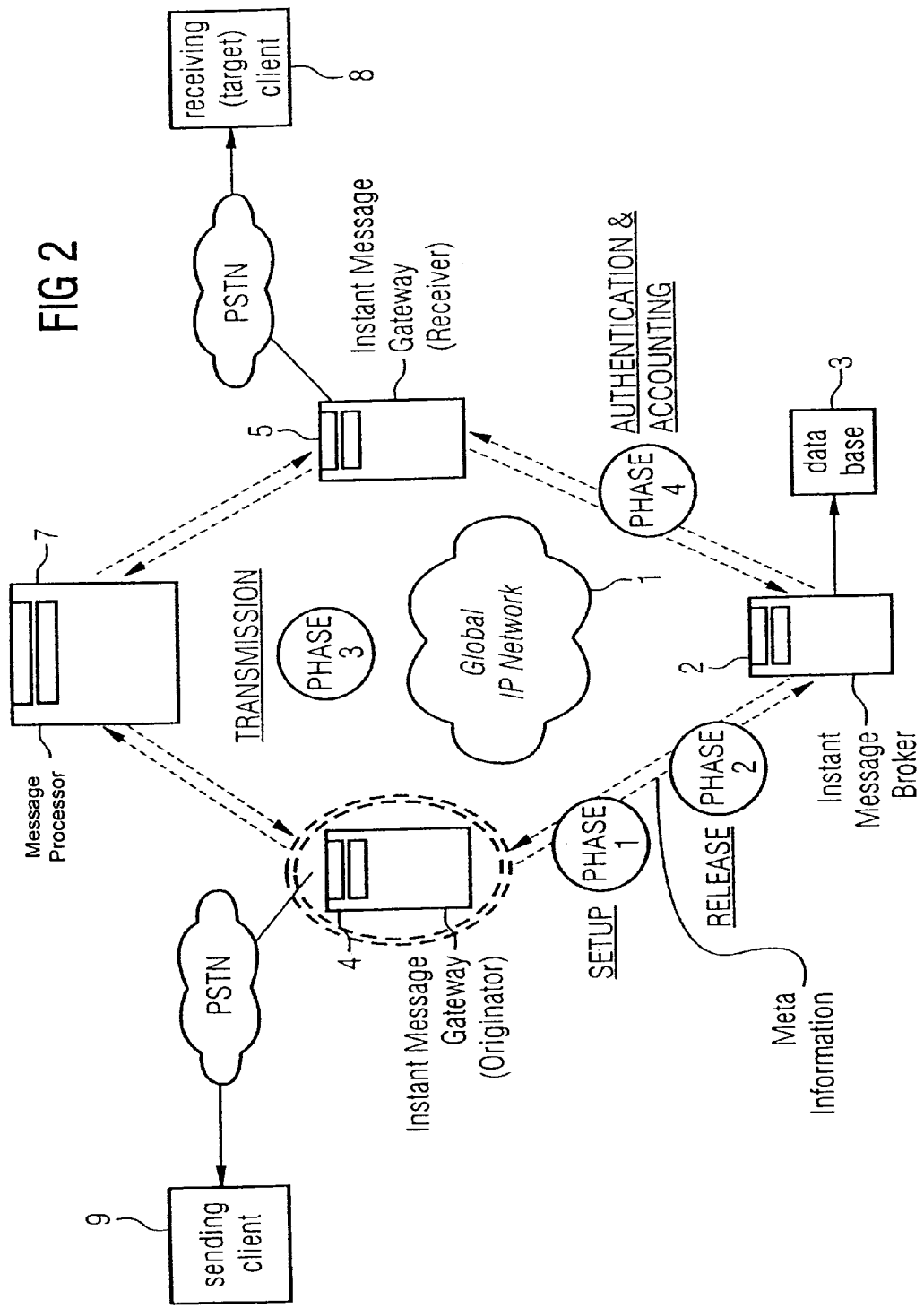
FIG. 2 shows a communication structure of a messaging system.

FIG. 2 shows the communication structure of a messaging system. A configuration comprises an instant message gateway (originator) 4, an instant message gateway (receiver) 5 and a message broker 2 as well as additional units. The different units of such a system may be global distributed or located at a single computation node. In the example of FIG. 2 the data flow of such a minimal messaging system is schematically depicted.

In phase 1 the instant message gateway (originator) 4 receives a message from a client (e.g. a facsimile from a PSTN), prepares (extracts) meta information from the message received and sends the meta information to the message broker 2.

In phase 2 the message broker 2 determines the required message conversion and the message route according to the state of the messaging system and client (sender and receiver) profiles stored in the connected database 3. Additionally the message broker 2 can prepare message security and also indication. The modified meta information is than returned from the message broker 2 to the instant message gateway (originator) 4.

In phase 3 controlled by the meta information the instant message gateway (originator) 4 transmits the instant message (consisting of meta information and message content) to the instant message gateway (receiver) 5. In case where an additional message service or message conversion is required, the instant message can be routed over a message processor 7.

In phase 4 the instant message gateway (receiver) 5 transmits the (eventually converted) message to the client. After transmission, the instant message gateway (receiver) 5 sends an acknowledgement (e.g. delivery, client receipt, or non-delivery) to the message broker 2, wherein the acknowledgement controls the message flow.

Figure 3:
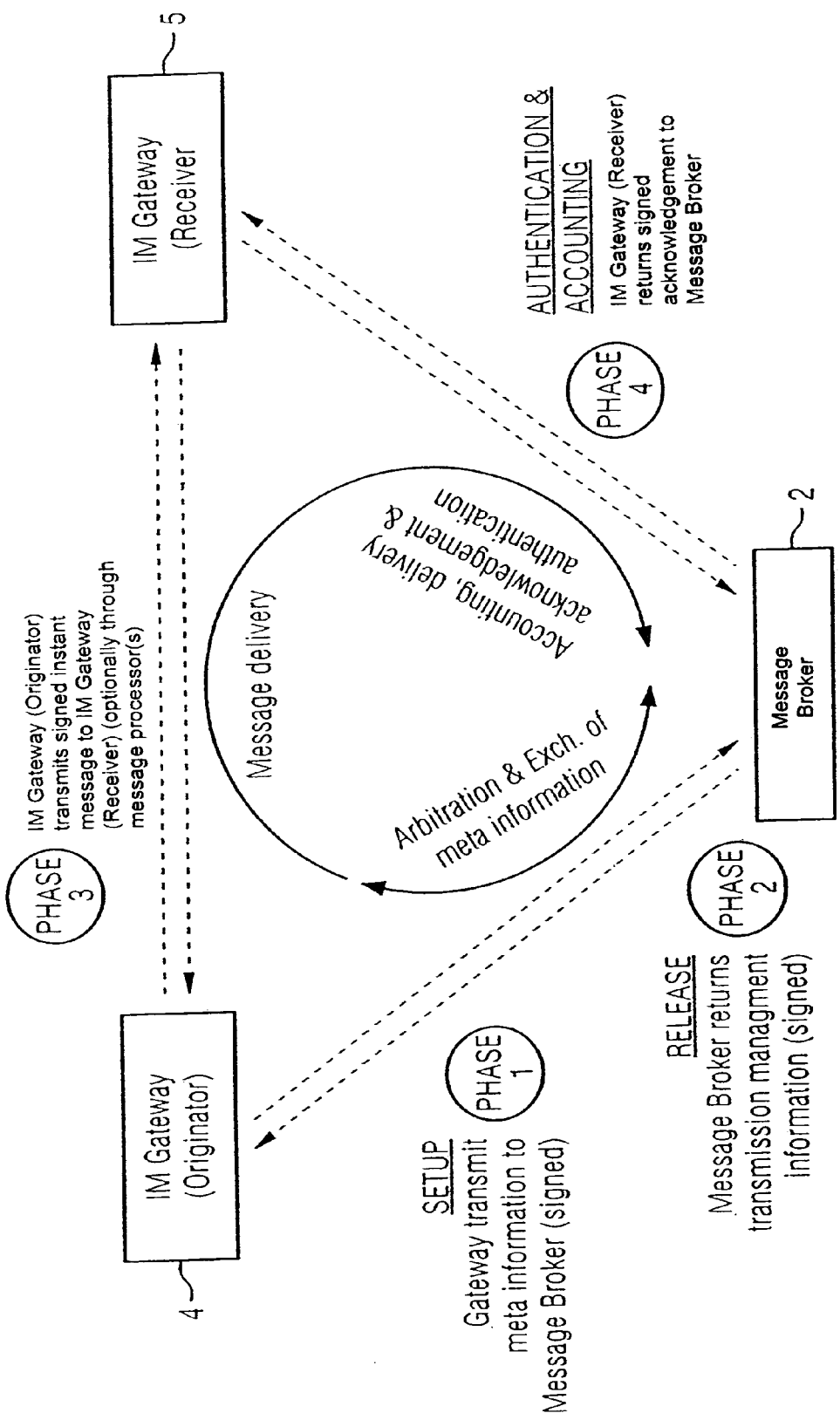
FIG. 3 shows a message and information authentication protocol.

FIG. 3 shows in detail the message and information authentication protocol. At first in a set-up phase one the instant message gateway (originator) 4 transmits meta information to the message broker 2, wherein the meta information can be signed.

In a release phase 2, the message broker 2 returns transmission management information (signed).

In a transmission phase three the instant message gateway (originator) 4 transmits signed instant message to the instant message gateway (receiver) 5 (optionally through message processors 7).

In an authentication and accounting phase four the instant message gateway (receiver) 5 returns a signed acknowledgement to the message broker 2.

Figure 4:
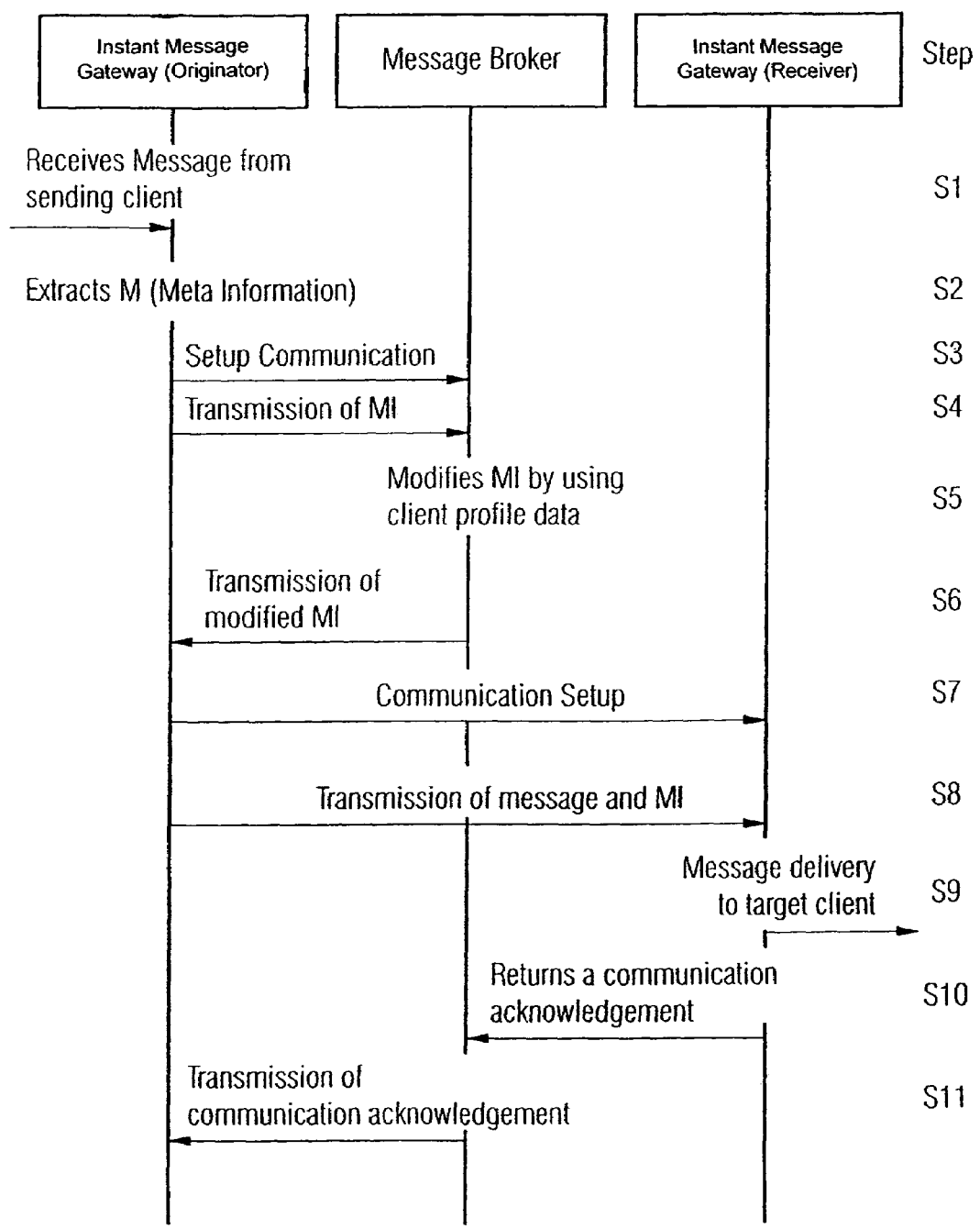
FIG. 4 shows a symmetric representation of the process according to the present invention.

As reference to FIG. 4, the message transmission according to the present invention will be explained by means of the graphical representation.

In step S1 the instant message gateway (originator) receives a message from a sending client. In a step S2 the instant message gateway (originator) extracts meta information by performing a predetermined processing. In a step S3 a communication between the instant message gateway (originator) and the message broker is set up and in a step S4 the meta information extracted in step S2 is transmitted. In step S5 the message broker modifies the meta information by using client profile data from connected client profile database. In step S6 the modified meta information (managing information) is transmitted from the message broker to the instant message gateway (originator). In step S7 communication between the instant message gateway (originator) and a instant message gateway is effected. In step S8 the message content and the meta information are transmitted from the instant message gateway (originator) to the instant message gateway (receiver). In step S9 the, message is delivered from the instant message gateway to the target client. In step S10 the instant message gateway returns a communication acknowledgment to the message broker. In step S11 the message broker sends an acknowledgement to the instant message gateway (originator).

With references to FIGS. 5A through 5D, the message and information authentication protocol will be explained in detail.

Figure 5:
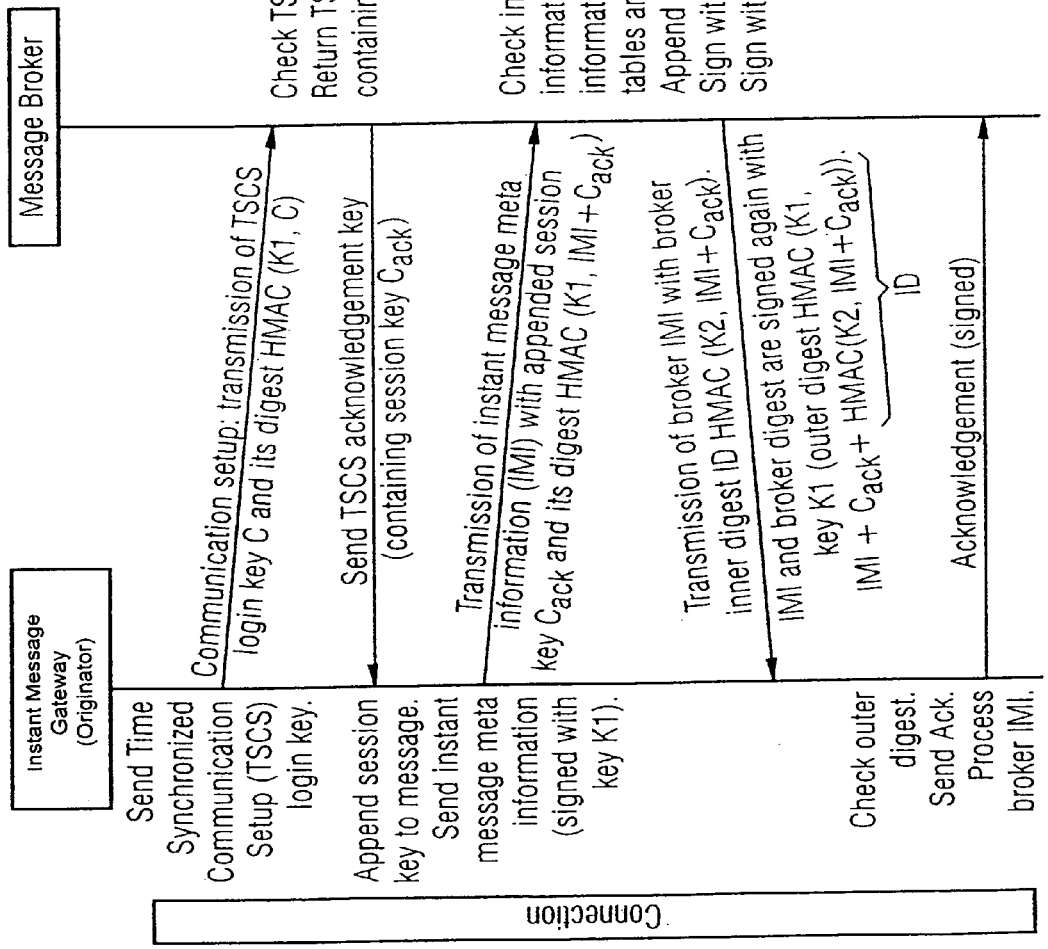
FIGS. 5a–5d show in detail a message and information authentication protocol.

In FIG. 5A, the instant message gateway (originator) sends a time synchronized communication set-up (TSCS) login key to the message broker. The communication is set up by the transmission of the TSCS login key C and its digests HMAC (K1, C). The message broker checks the TSCS login key and returns a TSCS acknowledgement key containing a session key. The TSCS acknowledgement key containing the randomly generated session key $C_{ack}$ is sent to the instant message gateway (originator). Note that the different session keys are randomly generated and unique for each communication step they are applied in.

The instant message gateway (originator) appends the session key to the message and sends an instant message meta information (IMI) signed with the key K1 to the message broker. The instant message meta information (IMI) is transmitted with the appended session key $C_{ack}$ and ist digests HMAC (K1, IMI+$C_{ack}$). The message broker checks the instant message meta information (IMI) and inserts and modifies information in the IMI by using user profile tables and database information. The session key is appended to the message. The message is than signed with key K2 and key K1. The broker IMI is transmitted with the broker inner digest ID (corresponding to HMAC (K2, IMI+$C_{ack}$). The IMI in the broker digest are signed again with key K1 (outer digest HMAC (K1, IMI+$C_{ack}$+HMAC (K2, IMI+$C_{ack}$)).

The instant message gateway (originator) checks the outer digest and sends an acknowledgement process broker IMI to the message broker.

In FIG. 5B, the instant message gateway (originator) then set ups a communication by the transmission of the TSCS login key C and its digest HMAC (K1, C) to the instant message gateway (receiver). The instant message gateway (receiver) checks the TSCS login key and returns a TSCS acknowledgement key containing a session key. Therefore the TSCS acknowledgement key containing the session key $C_{ack}$ is sent to the instant message gateway (originator).

The instant message gateway (originator) appends the session key to the message and sends an instant message signed with key K1 to the instant message gateway (receiver). Therefore an instant message (IM) (i.e. message data and IMI) containing the message M is transmitted to the instant message gateway (receiver).

The instant message gateway (receiver) checks the instant message, converts the instant message and sends an acknowledgement which is signed to the instant message gateway (originator). The session is than finished for the instant message gateway (originator).

As shown in FIG. 5C, the message is then delivered from the instant message gateway (receiver) to the target client (customer).

The instant message gateway (receiver) is then sending a TSCS login key for a communication set-up to the message broker.

The message broker checks the TSCS login key and returns a TSCS acknowledgement key containing a session key to the instant message gateway (receiver). In the acknowledgement step the instant message gateway (receiver) returns the broker ID (generated previously by the message broker) and a message delivery read acknowledgement and signs it with the key K1.

The instant message gateway (receiver) sends a broker IMI, message delivery/read acknowledgement and signs it with K1.

The message broker checks the outer digest generated by the instant message gateway (receiver) with the key K1, checks the returned ID by comparing it with its own (stored) previously generated ID sent to the instant message gateway (receiver), processes the acknowledgement, terminates the transaction and returns the acknowledgement to the instant message gateway (receiver).

The instant message meta information integrity and origin is assured by the generation of the meta information inner digest ID (by using the message broker key K2) and the comparison with the inner digest ID received from the instant message gateway (receiver). Therefore the message broker can positively control the proper transmission of the inner digest ID from the sending gateway to the instant message gateway (receiver). Furthermore it can be assured that no communication between the sending gateway and the instant message gateway (receiver) is possible without intervention of the message broker.

As shown in FIG. 5D, the message broker then sends a TSCS login key for a communication set-up to the instant message gateway (originator).

The instant message gateway (originator) checks the digest, processes the acknowledgement, notifies the sending client and returns an acknowledgement to the message broker.

The message broker than transmits a transmission message delivery acknowledgement signed with K1 to the instant message gateway (originator).

The instant message gateway (originator) checks the TSCS login co-key and returns a TSCS acknowledgement key containing the session key to the message broker.

The invention, therefore, provides a technique for (nearly) real-time capital flow control of direct messaging in a distributed messaging system.

The purpose of instant messaging is to transmit high priority messages in (nearly) real-time between clients (man and machine). Unified messaging merges analog and digital transmitted messages such as facsimile, voice mail, e-mail, WWW and the cell phone short message service (GSM/SMS) to unified instant messages. A Unified Instant Messaging System (UIMS) is a (global) distributed system that consists of four major components that communicate with each other over an IP network: distributed gateways, message processors message brokers and a client directory database. Messages of arbitrary form are converted into Unified Instant Messages by the Instant Message Gateways and vice versa. The Message Brokers (MB) controls the message flow, accounting and message conversion Additionally message brokers must ensure the authentication and security of instant messages to prevent the distributed system from unauthorized access.

The present invention is an efficient data transmission protocol for the transmission of messages in nearly real-time. In an UIMS a relatively small number of message brokers manages the message transfer, processing and security. Thus, the communication protocol and unified message structure is optimized for high message throughput and a minimum broker load. Instead of complete message transmission and processing, MBs process message meta information.

The present invention describes an apparent and method for controlling message flow and processing in a distributed instant (i.e. nearly real-time) messaging systems. Because of the meta information is much more compact as the message itself, a higher throughout with reduced data transfer is reached. The (meta) message content and control flow is transmitted with authentication which means that it allows the communicating parties (gateways processors and brokers) to verify that the received messages (as well as the true and alleged originator) are authentic. In MIAP information is authenticated using Time Synchronised Communication Setup by Keyed-Hashing Message Authentication (TSCS) for message authentication.

Authenticated, high throughput apparatus and method (protocol) for a communication in distributed, direct messaging systems are proposed. The message flow control and further messaging process of such a system is managed by one of several instances of message brokers. Time synchronised communication set up by keyed-hashing method authentication (TSCS) for message authentication is used.

The invention claimed is:

1. A method for transmitting messages in a distributed system, the method comprising:

receiving a message comprising a message content and meta information from a sending client by a first message gateway, extracting the meta information from the received message, transmitting the meta information from the fist message gateway to a message broker while keeping the received message content at the first message gateway, selecting, by the message broker, a second message gateway and a message content conversion of the message content on the basis of the meta information and profile data of the target client managed by the message broker, transmitting modified meta information including message messaging information from the message broker to the first message gateway, and after receiving the modified meta information converting the message content and transmitting a message including the converted message content from the first message gateway to the selected second message gateway so that the second message gateway can transfer the message to a target client, wherein the message broker is an entity physically separated from the first and second message gateways.

2. A method according to claim 1, wherein the message broker processes the meta information to provide security and returns the meta information to the first message gateway.

3. A method according to claim 1, wherein the message broker processes the meta information and returns the meta information to the first message gateway, and wherein the message is sent to the selected second gateway together with the meta information under the control of the processed meta information.

4. A method according to claim 1 wherein the message content is converted by a message processor prior to being sent to the selected second message gateway.

5. A computer program stored in a tangible storage medium, for transmission of messages in a distributed system, the program comprising executable instructions that cause a computer to:

receive a message comprising a message content and meta information from a sending client by a first message gateway;

extract the meta information for the received message;

transmit the meta information from the first message gateway to a message broker while keeping the received message content at the first message gateway, select, by the message broker, a second message gateway and a message conversion of the message content on the basis of the meta information and profile data of the target client managed by the message broker;

transmit modified meta information including message managing information from the message broker to the first message gateway; and after receiving the modified meta information convert the message content and transmit a message including the converted message content from the first message gateway to the selected second message gateway so that the second message gateway can transfer the message to a target client, wherein the message broker is an entity physically separated from the first and second message gateways.

6. A distributed system to transmit messages, the system comprising:

a first message gateway configured to receive messages comprising a message content and meta information from sending clients, the first message gateway configured to extract the meta information from the received messages, a message broker configured to receive only the extracted meta information from the first message gateway, the message broker processing the meta information and selecting a second message gateway and a message conversion of the message content on the basis of the meta information and profile data of the target client managed by the message broker, and returning the processed meta information to the first message gateway, and a second message gateway configured to receive the a message including a converted content from the first message gateway controlled by the processed meta information, and to transfer the received message to a target client, wherein the message broker is an entity physically separated from the first and second message gateways.

7. A distributed system according to claim 6, further comprising a client profile database connected to the message broker, wherein the message broker processes the meta information on the basis of the data of the client profile database.

8. A distributed system according to claim 6, wherein the message broker provides for a security functionality.

9. A distributed system according to claim 6, further comprising a message processor interconnected between the first and second message gateway for processing the content of the message.

* * * * *